Oct. 23, 1928.
A. H. HANDLAN
1,688,619
FOCUSING DEVICE
Filed July 3, 1924
2 Sheets-Sheet 1
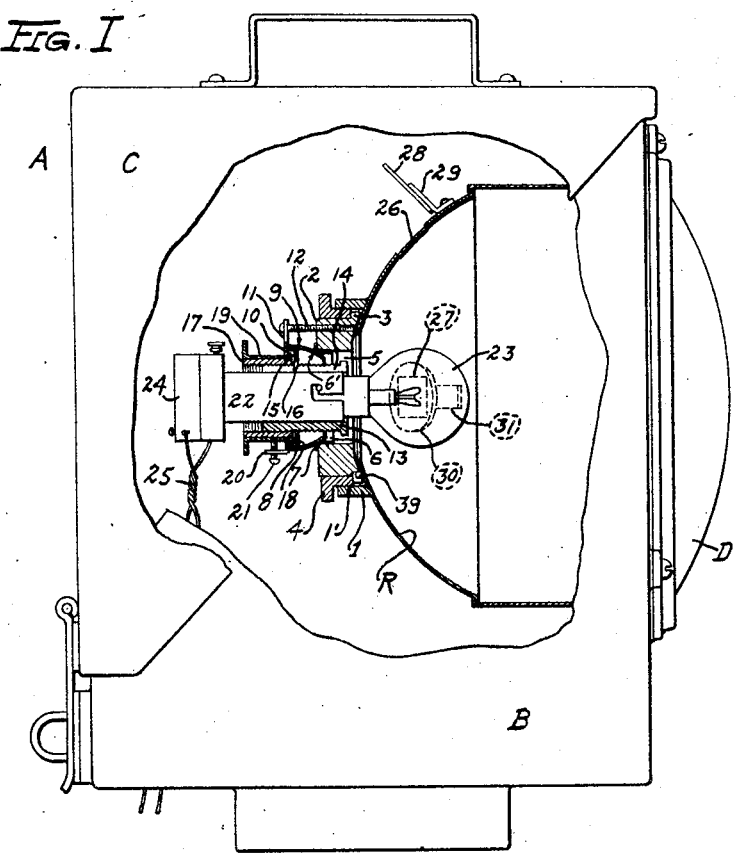
Fig. I
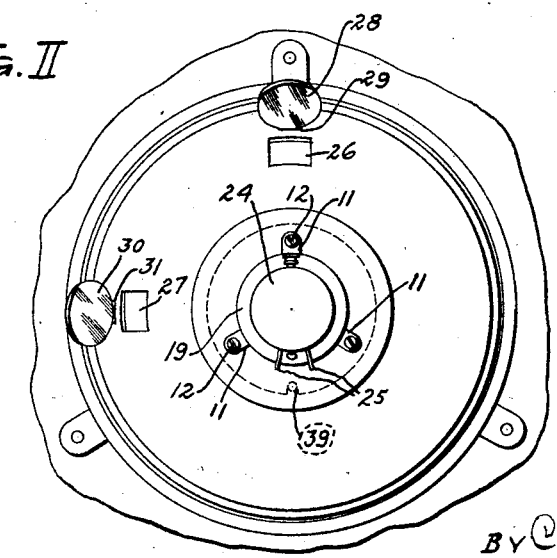
Fig. II
INVENTOR
A. H. HANDLAN
BY Cook & McCauley
ATTORNEYS Oct. 23, 1928.
A. H. HANDLAN
FOCUSING DEVICE
Filed July 3, 1924
1,688,619
2 Sheets-Sheet 2
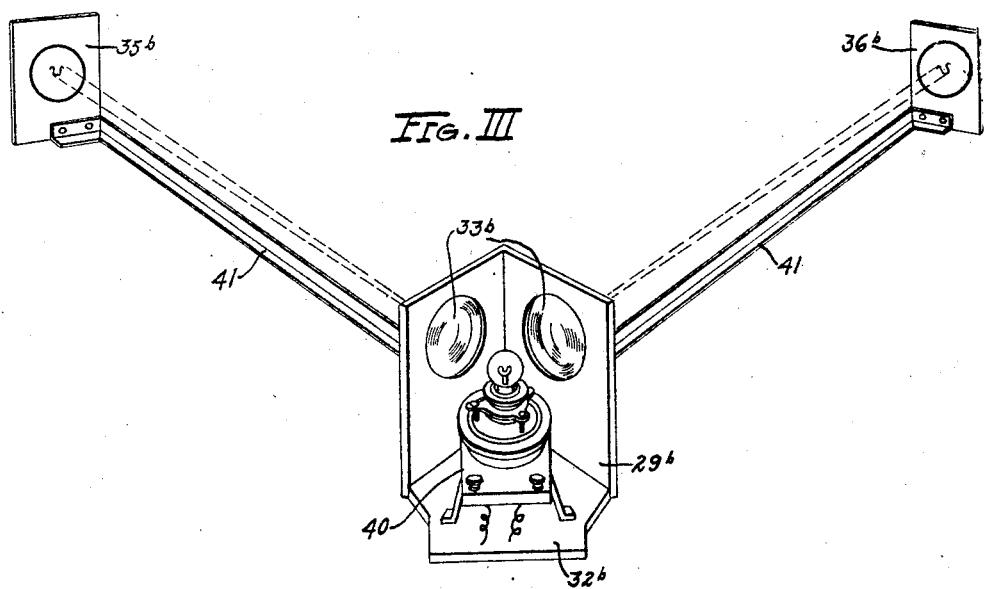
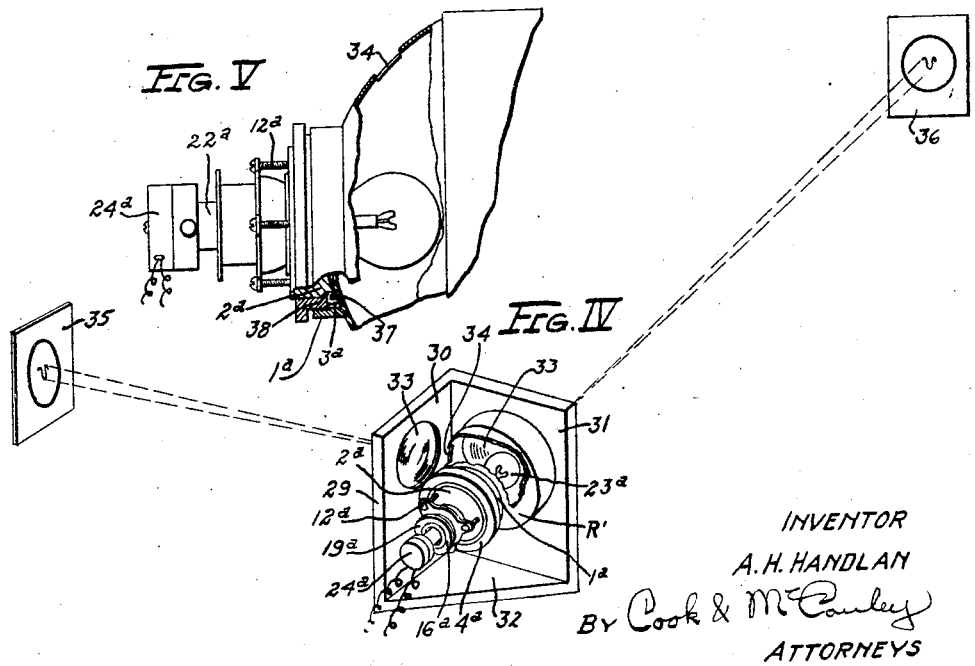
INVENTOR
A. H. HANDLAN
By Cook & McCauley
ATTORNEYS Patented Oct. 23, 1928.

1,688,619

UNITED STATES PATENT OFFICE.

ALEXANDER H. HANDLAN, OF ST. LOUIS, MISSOURI.

FOCUSING DEVICE.

Application filed July 3, 1924. Serial No. 723,884.

This invention relates generally to focusing devices, and particularly to a focusing device which may be associated with an electric lantern whereby the light-producing element within said electric lantern may be properly focused with respect to the lens or lenses of said lantern. While my improved focusing device may be used in any electric lantern regardless of the use to which said lantern is applied, still said focusing device is intended particularly for use in electric lanterns of the various types which are used for signaling purposes on railroads. It is very well known that the safety of the lives of passengers riding on railroad trains and the preservation of the property of the railroad company require the use of signal lanterns which will operate with the highest possible efficiency at all times, hence the great need for a device such as the one disclosed herein.

Prior to this invention much annoyance and inconvenience was occasioned by the inability of the railroad companies to obtain electric lamps which were accurately made, in other words, electric lamps the filaments of which were properly positioned in said lamps. For an electric lantern to function in an entirely efficient manner it is necessary that the filament of the electric lamp within said lantern be in a certain position relative to the lens or lenses of the lantern. To obtain electric lamps which were as close to perfect as it was possible to secure, the railroads were required to buy only those electric lamps which were selected after very careful inspection, and even then the lamps obtained were not always what was desired, for it is only necessary for the filament of an electric lamp to be out of position a very slight degree to render it impossible to focus that lamp in a lantern designed for use with perfectly formed electric lamps.

To remedy the inconvenience suggested above, the manufacturers of electric lamps resorted to the practice of rebasing the electric lamps intended for railroad signaling use. By this system each electric lamp was provided with a false base which was placed on the lamp. The lamp was focused at the factory, and after said lamp was properly focused the false base was permanently secured in place on said lamp, thus insuring the proper focalization on said lamp when it was placed in a standard lantern. While the rebased electric lamps were vast improvements over the ordinary lamps, still they were objectionable for the reason that the rebasing operation rendered said lamps quite expensive.

The purpose of the present invention is to produce a focusing device by means of which the ordinary run of electric lamps produced by the manufacturers may be purchased by railroad companies, and briefly stated the invention contemplates providing each of the lanterns in which the electric lamps are to be used with means whereby the electric lamp arranged therein may be readily and accurately focused by a single operator, thus eliminating the danger and inconvenience caused by improperly focused electric lamps.

My invention also includes means whereby an electric lamp may be focused in a focusing lantern which is separate and distinct from the lantern in which the electric lamp is to be used.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of a lantern provided with my improved focusing means, a portion of the housing of said lantern being broken away to show the interior thereof.

Fig. II is a rear elevation of the focusing mechanism associated with the lantern shown in Fig. I.

Fig. III is a perspective showing a modified form of my invention.

Fig. IV is a perspective showing another modification of my invention.

Fig. V illustrates my improved focusing device associated with a fragment of a reflector, portions of said reflector and said focusing device being shown in section to illustrate the means for compelling the proper arrangement of the lamp within the lantern.

In the drawing, A designates a signal lantern of the type which is in general use on railroads at the present time, said lantern comprising a body portion B, a movable portion C to permit access to the interior of said lantern, and a lens D.

Located within the lantern A is a reflector R. The reflector R is arranged in place in the lantern in the usual manner, and said reflector is provided with an internally threaded socket 1. 2 designates a circular fiber block or base which is provided with an annular flange 3 which bears against the rearmost face of the reflector R, said fiber block being extended into said socket 1 and being of such diameter that an annular space is provided between the outer face of said circular block and the inner face of the wall of said socket 1. Arranged to extend into the annular space mentioned is a ring 4, the annular wall of said ring being L-shaped in cross section and said ring being provided with external screw threads which cooperate with the screw threads 1' located within the socket 1. As will be seen by referring to Fig. I, the annular flange 3 on the fiber block 2 is confined between the innermost end of the ring 4 and the rearmost face of the reflector R when said ring 4 has been screwed into place within the socket 1 whereby said fiber block is very securely held in place within said socket. The fiber block 2 is provided with a central opening 5 and extended into this central opening is a sleeve-like member 6 provided with an annular flange 7 which overlaps the outer face of said outer block.

8 designates a movable element which is provided with a semicircular portion 9. The semicircular portion 9 is preferably in the form of a shell of comparatively thin metal and is of such dimensions as to extend into the sleeve-like member 6 associated with the fiber block 2. It will be seen that the member 6 is provided with an annular corner 6' with which the semicircular portion 9 contacts, and it will be noted by referring to Fig. I that this corner is curved. By this arrangement it is plain that the semicircular portion 9 may be rocked relative to the member 6, said semicircular portion and said member 6 functioning very much like a ball and socket joint. Secured to the semicircular portion 9 of the movable element 8 is a plate 10. The plate 10 is secured by means of solder or in any other convenient manner to the semicircular portion 9, and said plate is provided with a plurality of ears 11. Extended through each ear 11 is an adjusting screw 12. There are preferably three ears 11 and three adjusting screws 12, each of said screws passing through the associated ear and extending into internally threaded openings in the fiber block 2 (Fig. I). It is plain from the foregoing that by manipulating the screws 12, the plate 10 and semicircular portion 9 may be adjusted relative to the fiber block 2, for it is apparent that if one of the screws 12 were screwed inwardly and the associated screws 12 were moved outwardly the axis of the movable element would be shifted accordingly.

13 designates an externally threaded sleeve which is arranged longitudinally of the axis of the movable element 8. The externally threaded sleeve 13 is provided with a slot 14 which extends longitudinally of said sleeve, as shown in Fig. I. Secured to the plate 10 by means of solder or in any other suitable manner is a collar 15, said collar being L-shaped in cross section and being provided with a projection 16 which extends into said elongated slot 14. Arranged on the externally threaded sleeve 13 is an internally threaded sleeve 17, the threads of said sleeve 17 cooperating with the threads of said sleeve 13, as shown in Fig. I. The sleeve 17 is provided with an outwardly extending annular flange 18 at its inner end. Mounted on the sleeve 17 is an outer sleeve 19, said sleeve 19 being secured to the sleeve 17 in any convenient manner so that said sleeve 17 and said sleeve 19 will rotate as a unit. It will be observed by referring to Fig. I that the inner end of the outer sleeve 19 is spaced apart from the adjacent face of the annular flange 15 and that the inner edge portion of the annular plate 10 extends into the space between said parts. It is apparent that the outer sleeve 19 and the threaded sleeve 17 may rotate relative to the plate 10, but it is also plain that said sleeves may not move longitudinally of the axis of the movable element 8. 20 designates an ear formed on the plate 10, said ear being provided with an internally threaded opening, and 21 indicates a locking screw which passes through said opening in said ear. The screw 21 is adapted to be adjusted so that an end thereof will bear against the outer sleeve 19, so that said outer sleeve may be prevented from being accidentally rotated. Located within the externally threaded sleeve 13 is an electric lamp socket 22 of a common type, said socket being fixed to said externally threaded sleeve and being adapted to move therewith. Arranged at an end of the socket 22 is an electric lamp 23, and fixed to the opposite end of said socket is a connecting device 24 by means of which electric conductors 25 are connected to said socket in a manner to supply electrical current to the electric lamp 23.

Arranged in the reflector R of the lantern A in vertical alinement with the electric lamp 23 is an opening 26, and arranged in said reflector in horizontal alinement with said electric lamp is a second opening 27. Located adjacent to the opening 26 is a small mirror 28, which is supported by the reflector R through the medium of the bracket 29, said bracket being secured to said reflector and to said mirror as shown in Fig. I. Located adjacent to the opening 27 is a second mirror 30 which is a counterpart of the mirror 28, and said mirror 30 is likewise supported by the reflector R through the medium of a bracket 31. The positions of the mirrors 28 and 30 are such that that point which is the precise point at which the filament of the electric lamp of the lantern should be located for said electric lamp to be in proper focus is in vertical alinement with the mirror 28 and horizontal alinement with the mirror 30, and consequently all that need be done to properly focus an electric lamp within the lantern A is to manipulate the adjusting device until the filament of the electric lamp is reflected at the exact centers of the mirrors 28 and 30.

In focusing an electric lamp in a lantern made in accordance with my invention, the entire focusing operation is as follows:

The electric lamp is introduced into an end of the socket 22 in the usual manner, and if said electric lamp is not in proper focus the reflections of the filament of said electric lamp will not appear at the exact centers of the mirrors 28 and 30. Assume, for instance, that the filament of the electric lamp which is being arranged within the lantern A is offset in a horizontal direction from a line drawn through the exact center of the lens D on which line said filament should be located. With the filament in the position suggested, the reflection of said filament in the mirror 28 would be slightly offset from the center of said mirror, and to bring said filament to its proper position the screws 12 would be manipulated. As the different screws 12 are moved forwardly or rearwardly, the movable portion 8 would be moved relative to the fiber block 2 and the filament of the lamp would be shifted relative to the lens of the lantern. It is apparent from the foregoing that the person performing the focusing operation may readily determine by the position of the reflection of the filament on the mirror 28 when said filament is in its proper position.

It may happen that the filament is slightly higher or lower than the center of the lens D, and if this is so the screws 12 will be manipulated to move the filament in a vertical direction to bring said filament to its proper position, and in this case the proper positioning of the filament will be determined by the reflection thereof on the mirror 30. It sometimes happens that the electric lamps are so made that the filaments thereof are too close to or too far away from the lens of the lantern. If this were true of a lamp being arranged in a lantern made in accordance with my invention, the outer sleeve 19 would be rotated to shift said lamp in a direction toward or away from said lens. The sleeve 19 is secured to the internally threaded sleeve 17 and the threads of said internally threaded sleeve cooperate with the threads of the externally threaded sleeve 13. It will be remembered that the projection 16 extends into the elongated slot 14 in the sleeve 13, consequently said sleeve is not permitted to rotate. It is plain, therefore, that when the outer sleeve 19 and the internally threaded sleeve 17 are rotated, the externally threaded sleeve 13 will be caused to move longitudinally according to the direction of rotation of said outer sleeve and said internally threaded sleeve, and because the socket 22 is secured to the externally threaded sleeve 13 it is apparent that the electric lamp 23 will move with said sleeve 13.

In view of the foregoing it is plain that the lantern disclosed in the present application includes means whereby an electric lamp may be moved universally with respect to the lens of said lantern, and said lantern also includes means whereby it may be determined when the electric lamp is in proper focus.

It may be desirable to provide a focusing set which is separate from the lanterns in which the lamps being focused are to be used. In Fig. IV I have shown a focusing set which comprises a member 29 having a pair of vertical walls 30 and 31 and a bottom wall 32. The vertical walls 30 and 31 are arranged at a right angle to each other, and each of said walls is provided with a lens 33. The member 29 is provided with a reflector R' which is an exact counterpart of the reflector R associated with the lantern shown in Fig. I, said reflector R' being secured to the wall 31 of the member 29 just as the reflector R is secured to the front wall of the lantern A. The reflector R' is provided with a socket 1ª into which the fiber block 2ª is inserted, just as the fiber block 2 is inserted into the socket 1 of the reflector R of the lantern A, said fiber block being held in place in said socket 1ª by means of a ring 4ª which contacts with an annular flange 3ª forming a part of said fiber block.

The focusing set illustrated in Figs. IV and V is provided with a movable element 16ª, which is capable of being moved relative to the fiber block 2ª through the manipulation of the screws 12ª. The structure illustrated in Figs. IV and V also includes a socket 22ª, which is capable of longitudinal movement through the rotation of the sleeve 19a. The electric lamp 23ª in Fig. IV is in the same position relative to the lens 33 as said lamp would be relative to the lens D if said lamp were located in the lantern A, and as all of the mechanism which is shown in Fig. I for adjusting the electric lamp is present in Fig. IV, it is apparent that the lamp 23ª may be subjected to the same adjustment relative to the lens 33 as it would be relative to the lens D if it were located within the lantern A. Arranged in the reflector R in alinement with the lens 33 in the wall 30 is an opening 34, and located in alinement with the lens 33 in the wall 30 is a target 35. Arranged in alinement with the lens 33 in the wall 31 is a second target 36.

By referring to Fig. I it will be seen that the fiber block 2, the movable element 8, the longitudinally movable sleeve 13, the rotatable sleeves 17 and 19, and various small parts associated with the parts enumerated are connected together and form a single unit, which for convenience may be called the focusing unit. Also it is quite apparent that this focusing unit may be removed as a whole from the lantern A by merely removing the ring 4. To focus an electric lamp by means of the focusing set shown in Figs. IV and V, it is only necessary to introduce an electric lamp in an end of the electric lamp socket associated with one of the focusing units, and after removing the ring 4ª from the socket 1ª of the focusing set to introduce the block 2ª of said focusing unit into said socket 1ª and replace the ring 4ª, as shown most clearly in Fig. V. This will cause the focusing unit to be securely held in place, and the adjusting devices of said focusing unit may be adjusted to cause the image of said filaments to be thrown directly in the centers of the circles on the targets 35 and 36. After the lamp has been focused as described, the threaded ring 4ª is unscrewed and the connecting device 24ª is removed from the outer end of the socket 22. The entire focusing unit with the lamp associated therewith is then removed from the focusing set, and said lamp and focusing unit is ready for use in a lantern. When it is desired to arrange the focusing unit in a lantern, the threaded ring 4 of said lantern would be removed from the socket 1 thereof and the focusing unit arranged in place in said socket, after which the ring 4 would be replaced to hold said focusing unit in place. After the focusing unit had been located within the lantern as described, said lantern would again be in working condition with the properly focused lamp therein, due to the fact that the focusing set in which the lamp was focused and the lantern into which said lamp was placed for service were standard in every respect.

It is highly desirable that the filament of the electric lamp be in the same position in the lantern in which it is to be used as it was in the focusing set; in other words, that the same portion of the filament which was uppermost in the focusing set be uppermost in the lantern. I therefore provide a pin 37 which is located on the rearmost face of the reflector R' of said focusing set. Located in the flange 3ª of the fiber block 2ª is a notch 38, said notch being so located that the pin 37 will enter said notch when the fiber block is in a certain position. The reflector R in every lantern is also provided with a pin 39 (Fig. I). When a focusing unit is associated with the focusing set shown in Fig. IV, the notch 38 in the fiber block is brought to a position where the pin 37 will extend into said notch. The electric lamp will then be focused, as already described, after which the focusing unit will be removed from said focusing set. When it is desired to incorporate the focusing unit in a lantern, the notch 38 must be brought to a position where it registers with the pin 39 on the reflector of said lantern. This will have the effect of causing the filament of the electric lamp to be in the same position relative to the lens D of the lantern as it was to the lens 33 of the focusing set.

Fig. III illustrates another form of my invention. This view shows a focusing set which is similar to the focusing set shown in Fig. IV but differs from it in several respects. The focusing set shown in Fig. III is intended for use in focusing lamps to be used in lanterns which are not provided with reflectors. In the lanterns mentioned the lamp supports are supported by the bottom walls of the lanterns, and this is the way the focusing set shown in Fig. III is arranged, there being a vertical lamp support 40 secured in any suitable manner to the bottom wall 32ᵇ of the member 29ᵇ. In focusing an electric lamp by means of the focusing set shown in Fig. III, the same adjustments are made as were made with the focusing set shown in Fig. IV, and the rays of light are cast through the lenses 33ᵇ to the targets 35ᵇ and 36ᵇ as illustrated. The targets 35ᵇ and 36ᵇ are supported by the member 29ᵇ through the medium of a pair of supports 41, so that said member 29ᵇ and the associated targets may be moved from place to place as a single unit.

This invention is based upon new features not disclosed in an application for patent filed by George H. Rolfes on February 18, 1924, Serial Number 693,491, the entire right, title and interest in and to which was assigned to me, and which includes claims broad enough to cover the focusing device herein described.

I claim:

1. A focusing device for an electric lantern having an electric lamp therein, comprising a movable support for said electric lamp and targets associated with said lantern against which rays of light from said electric lamp are thrown, said targets being located at an angle to each other and being located on different imaginary radial lines extended from said electric lamp, so that proper focalization of said lamp will be determined by the location of the rays of light on said targets, and said targets being so located that the faces thereof against which the rays of light are thrown may be simultaneously viewed from a fixed position, and means adapted to compel the arrangement of said lamp within said lantern in a predetermined position, said means comprising a pin on one element of said lamp support adapted to enter a notch in another element of said lamp support.

2. A focusing device for an electric lantern having an electric lamp therein, comprising a movable support for said electric lamp and targets associated with said lantern against which rays of light from said electric lamp are thrown, said targets being located at an angle to each other and being located on different imaginary radial lines extended from said electric lamp, so that proper focalization of said lamp will be determined by the location of the rays of light on said targets, and said targets being so located that the faces thereof against which the rays of light are thrown may be simultaneously viewed from a fixed position, and means adapted to compel the arrangement of said lamp within said lantern in a predetermined position, said means comprising interengaging parts located one on said lamp support and one on an element carried by said lamp support.

In testimony that I claim the foregoing I hereunto affix my signature.

ALEXANDER H. HANDLAN.